(12) United States Patent
Wei et al.

(10) Patent No.: US 9,054,932 B2
(45) Date of Patent: Jun. 9, 2015

(54) WIRELESS RECEPTION SYSTEM AND METHOD FOR ESTIMATING CHANNEL EFFECT THEREOF

(71) Applicant: MStar Semiconductor, Inc., Hsinchu Hsien (TW)

(72) Inventors: Fong-Shih Wei, New Taipei (TW); Yi-Ying Liao, Taipei (TW)

(73) Assignee: MSTAR SEMICONDUCTOR, INC., Hsinchu County (TW)

( * ) Notice: Subject to any disclaimer, the term of this patent is extended or adjusted under 35 U.S.C. 154(b) by 0 days.

(21) Appl. No.: 14/140,838

(22) Filed: Dec. 26, 2013

(65) Prior Publication Data

US 2014/0185660 A1 Jul. 3, 2014

(30) Foreign Application Priority Data

Dec. 27, 2012 (TW) .............................. 101150620 A

(51) Int. Cl.
*H04K 1/10* (2006.01)
*H04L 27/26* (2006.01)
*H04L 25/02* (2006.01)

(52) U.S. Cl.
CPC ........ *H04L 27/2647* (2013.01); *H04L 25/0204* (2013.01); *H04L 25/0232* (2013.01); *H04L 27/2663* (2013.01); *H04L 27/2695* (2013.01)

(58) Field of Classification Search
CPC ............. H04B 1/10; H04B 1/38; H04J 3/06; H04J 11/00; H04K 1/10; H04L 7/04; H04L 27/04; H04L 27/06; H04L 27/14; H04L 27/20; H04L 27/28; H04L 29/04; H04N 5/455; H04N 5/44; H04N 5/445
USPC ............... 348/726, 423.1, 725; 370/203, 210, 370/509; 375/144, 148, 219, 230, 260, 311, 375/329, 340, 343, 346, 229, 232, 330; 329/317
See application file for complete search history.

(56) References Cited

U.S. PATENT DOCUMENTS 7,058,134 B2 * 6/2006 Sampath ........................ 375/260
7,123,669 B2 * 10/2006 Ye et al. ......................... 375/341
(Continued)

FOREIGN PATENT DOCUMENTS

TW 200705913 A 2/2007
TW 201041347 A 11/2010

OTHER PUBLICATIONS

Taiwan Intellectual Property Office, "Office Action", Oct. 15, 2014.
(Continued)

*Primary Examiner* — Sam K Ahn
*Assistant Examiner* — Shawkat M Ali
(74) *Attorney, Agent, or Firm* — WPAT, PC; Justin King

(57) ABSTRACT

A wireless reception system includes a reception module, a preliminary estimation module, an equalization module and a selection module. The reception module receives a reference signal and at least one input signal transmitted via a multipath environment. The reference signal is associated with a known signal unaffected by the multipath environment. The preliminary estimation module generates a plurality of candidate channel effects according to the at least one input signal. The equalization module performs equalization on the reference signal according to the candidate channel effects to generate a plurality of equalization results. From the equalization results, the selection module selects an optimal equalization result that is most similar to the known signal, and selects the candidate channel effect corresponding to the optimal equalization result to represent the multipath environment.

8 Claims, 8 Drawing Sheets

(56) References Cited

U.S. PATENT DOCUMENTS

| | | | |
|---|---|---|---|
| 7,577,206 B2* | 8/2009 | Kim | 375/260 |
| 8,340,221 B1* | 12/2012 | Cheng et al. | 375/316 |
| 2002/0017948 A1* | 2/2002 | Hyakudai et al. | 329/304 |
| 2004/0184399 A1* | 9/2004 | Chiou | 370/206 |
| 2004/0228272 A1* | 11/2004 | Hasegawa et al. | 370/210 |
| 2005/0157801 A1* | 7/2005 | Gore et al. | 375/260 |
| 2007/0036232 A1* | 2/2007 | Hayashi | 375/260 |
| 2008/0030265 A1* | 2/2008 | Ido et al. | 329/317 |
| 2008/0063098 A1 | 3/2008 | Lai et al. | |
| 2008/0192846 A1* | 8/2008 | Bjerke et al. | 375/260 |
| 2010/0014600 A1* | 1/2010 | Li et al. | 375/260 |
| 2010/0142664 A1* | 6/2010 | Araki et al. | 375/348 |
| 2010/0177251 A1* | 7/2010 | Kimura et al. | 348/726 |
| 2010/0283902 A1* | 11/2010 | Rashid et al. | 348/725 |
| 2010/0284478 A1* | 11/2010 | Liao et al. | 375/260 |
| 2010/0309383 A1* | 12/2010 | Matsumura et al. | 348/725 |
| 2011/0249772 A1* | 10/2011 | Kimura et al. | 375/311 |
| 2012/0314750 A1* | 12/2012 | Mehrabani | 375/229 |

OTHER PUBLICATIONS

ETSI:"Digital Video Broadcasting (DVB); Framing structure, channel coding and modulation for digital terrestrial television", ETSI EN 300 744 V1.6.1 (Jan. 2009).

* cited by examiner

● : scatter pilot   △ : data   ■ : TPS

WIRELESS RECEPTION SYSTEM AND METHOD FOR ESTIMATING CHANNEL EFFECT THEREOF

This application claims the benefit of Taiwan application Serial No. 101150620, filed Dec. 27, 2012, the subject matter of which is incorporated herein by reference.

BACKGROUND OF THE INVENTION

1. Field of the Invention

The invention relates in general to a digital signal broadcasting technology, and more particularly, to a technology for estimating a channel effect of a multipath environment.

2. Description of the Related Art

Developments of digital television broadcasting have gradually matured with progresses of communication technologies. Besides being transmitted by cables, digital television signals may also be transmitted in form of wireless signals via base stations or artificial satellites. Digital Video Broadcasting-Terrestrial (DVB-T) and Integrated Services Digital Broadcasting-Terrestrial (ISDB-T) are prevalent standards adopted in the field of digital television broadcasting.

Multipath exists in most wireless communication environments. A receiver needs to evaluate a corresponding channel effect in order to correctly extract and utilize received data, e.g., to correctly identify boundaries between symbols in the signals. Taking DVB-T and ISDB-T signals for example, a possible outcome resulted from a channel effect misjudged by a receiver is given below.

FIG. 1(A) shows an example of a signal compliant to the DVB-T and ISDB-T specifications. The beginning of each symbol includes a section of channel pilot. The channel pilot is a duplication of an ending section of the symbol it belongs. That is to say, contents of the section CP1 are identical to those of the section E1, and contents of the section CP2 are identical to those of the section E2. FIG. 1(B) shows a possible result of the signal arriving at the receiver after passing through a multipath environment. At the time point t1, the signal transmitted via the first path (to be referred to as the first signal) first reaches the receiver; whereas the same signal transmitted via the second path (to be referred to as the second signal) only reaches the receiver at the time point t2. To identify a boundary between symbols, a receiver usually performs correlation calculation on received signals. The size of two sampling windows for the correlation calculation is the length of the section of the channel pilot, and a gap between the two sampling windows is fixed as a distance between the channel pilot section and the corresponding ending section. As seen from FIG. 1(C), the correlation is the highest when the two selected sampling windows (represented by the shaded areas) slide to the section CP1 and the section E1. In comparison, the correlation is lower when the two sampling windows are relocated to positions depicted in FIG. 1(D).

When considering the first signal alone, the relationship between its correlation result and the time is as the curve CR1 shown in FIG. 1(E). When considering the second signal alone, the relationship between its correlation result and the time is as the curve CR2 (assuming that the strength of the second signal is weaker, the peak of CR2 is lower than that of CR1). In practice, however, rather than independent first and second signals, the signal received at the receiver is a summed result (to be referred to as a summed signal) of the first signal and the second signal. Therefore, the curve representing the correlation result obtained by the receiver is the curve CR in FIG. 1(E), which is a sum of the curves CR1 and CR2.

As seen from FIG. 1(E), boundaries between the symbols in the first signal can be easily identified according to positions of the peaks of the curve CR1. Similarly, according to positions of the peaks of the curve CR2, boundaries between the symbols in the second signal can also be clearly identified. However, according to the curve CR, boundaries between the symbols in the summed signal cannot be directly and easily determined. This determination task is made even more challenging as a multipath environment that the summed signal passes through gets more complex or the level of signal interference imposed on the summed signal during the transmission process gets higher. Given that the receiver identifies the channel effect of the multipath environment that the summed signal passes through, parts accounted by the curves CR1 and CR2 can be identified from the curve CR, so that the first signal and the second signal can be retrieved from the summed signal and more ideal symbol boundaries can be selected. Without accurate evaluation on the channel effect of the multipath environment, symbol boundaries are likely misjudged at the receiver to further result in performance degradation in the reception system.

As shown in FIG. 2, in many wireless communication systems, the signal received by the receiver at a single time point $t_x$ simultaneously contains various frequency components ($F_1$ to $F_N$), i.e., the reception signal contains contents carried by numerous different types of subcarriers. The channel effect of the multipath environment that the signal passes through is in fact the sum of respective frequency-domain channel effects $H_1$ to $H_N$ corresponding to the subcarriers $F_1$ to $F_N$. That is to say, the most ideal approach for accurately estimating the channel effect of the multipath environment of the signal is to identify $H_1$ to $H_N$. However, because the data contents carried by the subcarriers maybe unknown to the receiver and a large amount of time is required for identifying all of the frequency-domain channel effects $H_1$ to $H_N$, such approach is not usually employed by the receiver. In practice, a possible approach is to estimate the frequency-domain channel effects corresponding to certain subcarriers; for example, frequency-domain channel effects ($H_0$, $H_3$, $H_6$, $H_9$ . . . ) corresponding to subcarriers ($F_0$, $F_3$, $F_6$, $F_9$ . . . ) having frequency indices in multiples of 3 are estimated. The receiver may then perform inverse fast Fourier transform (IFFT) on the channel effects to identify the corresponding time-domain channel effects.

As shown in FIG. 3(A), since each of the subcarriers ($F_0$, $F_3$, $F_6$, $F_9$ . . . ) having frequency indices in multiples of 3 carries a scatter pilot at a predetermined interval, the receiver only utilizes the frequency-domain channel effects corresponding to frequency indices in multiples of 3 as sampling values, and thus the IFFT results include three time-domain channel effects. Among the three time-domain channel effects, one is the real time-domain channel effect corresponding to the multipath environment, whereas the other two are duplications of the time-domain channel effect. In this example, the real time-domain channel effect of the multipath environment is possibly $h_1$ in FIG. 3(B), or $h_2$ in FIG. 3(C). The receiver needs to select either $h_1$ or $h_2$ as the time-domain channel effect to represent the multipath environment.

In the prior art, the receiver usually performs extensive tests on reception signals using $h_1$ and $h_2$, and selects $h_1$ or $h_2$ as the time-domain channel effect according to the test results. For example, a typical DVB-T receiver may determine respective corresponding symbol boundaries according to $h_1$ and $h_2$, and continuously analyze a bit error rate (BER) of multiple symbols according to the two different symbol boundaries. The receiver then selects the time-domain channel effect corresponding to the lower BER. One of the setbacks of such solution that selects one channel effect from a plurality of channel effects by carrying out extensive tests is extremely time-consuming. For a television system, this setback causes a long waiting period before a user can observe a correct image on the screen when switching channels.

SUMMARY OF THE INVENTION

The invention is directed to a wireless reception system and a method for estimating a channel effect thereof for solving the issues above. In the wireless communication system and the estimation method of the present invention, an equalization process corresponding to different channel effects is performed on a reference signal, and a channel effect best representing a multipath environment that the reference signal passed through is determined according to the equalization results obtained. Compared to the prior art that identifies the correct channel effect by performing extensive tests on input signals, the evaluation procedure of the present invention is much simpler and is thus capable of significantly reducing the related operation period. In addition to DVB-T or ISDB-T systems, the present invention is also applicable to situations where a correct channel effect needs to be selected from multiple candidate channel effects for a multipath environment.

According to an embodiment of the present invention, a wireless reception system is provided. The wireless reception system includes a reception module, a preliminary estimation module, an equalization module and a selection module. The reception module receives a reference signal and at least one input signal transmitted via a multipath environment. The reference signal is associated with a known signal unaffected by the multipath environment. The preliminary estimation module generates a plurality of candidate channel effects according to the at least one input signal. The equalization module performs an equalization process on the reference signal according to each of the candidate channel effects to generate a plurality of equalization results. The selection module selects an optimal equalization result most similar to the known signal from the equalization results, and selects the candidate channel effect corresponding to the optimal equalization result to represent the multipath environment.

According to another embodiment of the present invention, a method for estimating a channel effect is provided. The method includes: receiving a reference signal and at least one input signal transmitted via a multipath environment, wherein the reference signal is associated with a known signal unaffected by the multipath environment; generating a plurality of candidate channel effects according to the at least one input signal; performing an equalization process on the reference signal according to each of the candidate channel effects to generate a plurality of equalization results; and selecting an optimal equalization result most similar to the known signal from the equalization results, and selecting the candidate channel effect corresponding to the optimal equalization result to represent the multipath environment.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 4:
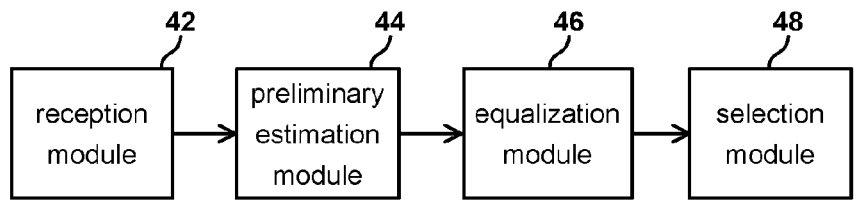
FIG. 4 is a block diagram of a wireless reception system according to an embodiment of the present invention.

FIG. 4 shows a block diagram of a wireless reception system according to an embodiment of the present invention. The wireless reception system 400 includes a reception module 42, a preliminary estimation module 44, an equalization module 46 and a selection module 48. In practice, the wireless reception module 400 may be implemented in applications where one channel effect is to be selected from multiple possible channel effects for a multipath environment. In the description below, the wireless reception system 400 as a receiver compliant to the ISDB-T specification is given as an example for illustrating the present invention, not for limiting the present invention.

Figure 5:
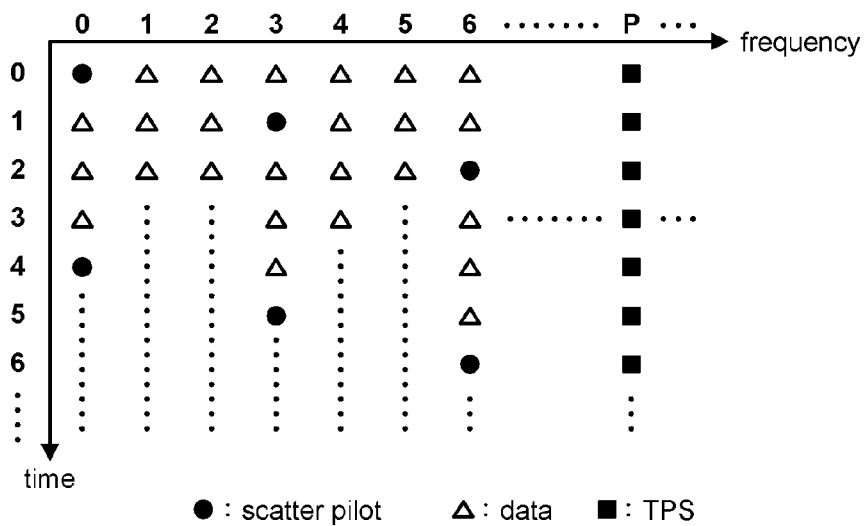
FIG. 5 is a schematic diagram of content configuration of an ISDB-T signal, with the horizontal axis representing frequency and the vertical axis representing time.

The reception module 42 receives signals provided from an ISDB-T transmitter. FIG. 5 shows a schematic diagram of the content configuration of an ISDB-T signal, with the horizontal axis representing frequency and the vertical axis representing time. As shown in FIG. 5, each of the subcarriers having frequency indices in multiples of 3 (e.g., 0, 3, 6, 9 . . . ) carries a scatter pilot at a predetermined interval, and the subcarriers having a frequency index P carry transmission parameter signaling (TPS). It should be noted that, P is not a multiple of 3, and there may be a plurality of subcarriers that carry the TPS. Further, original contents (i.e., contents before passing through and unaffected by the multipath environment) of the scatter pilots and TPS are known to the wireless reception system 400.

It should be noted that a physical location of the ISDB-T receiver is usually fixed, and the channel effect of the multipath environment between receiver and the transmitter also stays unchanged most of the time. Therefore, the wireless reception system 400 may select a signal that the reception module 42 receives at a particular time point (e.g., the signal having a time index of 2 in FIG. 5) as the reference for determining the channel effect of the multipath environment.

Figure 6:
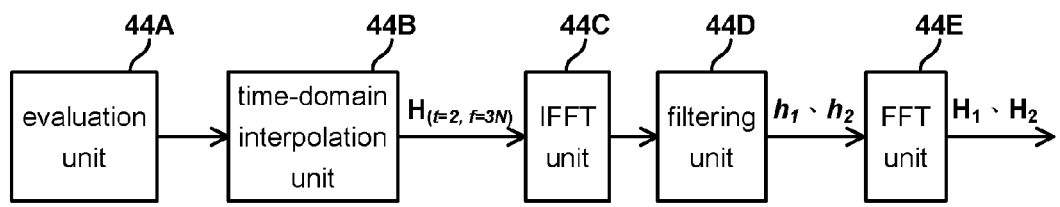
FIG. 6 shows a detailed example of a preliminary estimation module according to an embodiment of the present invention.

The preliminary estimation module 44 first identifies a plurality of possible candidate channel effects. As the original contents of the scatter pilots carried by the subcarriers having frequency indices in multiples of 3 are known, the preliminary estimation module 44 may estimate the channel effect according to the scatter pilots. FIG. 6 shows a detailed example of the preliminary estimation module 44. Referring to FIG. 6, the preliminary estimation module 44 includes an evaluation unit 44A, a time-domain interpolation unit 44B, an inverse fast Fourier transform (IFFT) unit 44c, a filtering unit 44D and a fast Fourier transform (FFT) FFT unit 44E.

Taking the channel effect corresponding to the signal having a time index of 2 for example, the evaluation unit 44A may identify respective channel effects of scatter pilots having time indices close to or equal to 2. For example, the evaluation unit 44A may identify the frequency-domain channel effect $H_{(t=0, f=0)}$ of the scatter pilot having a time index of 0 and a frequency index of 0, and the frequency-domain channel effect $H_{(t=4, f=0)}$ of the scatter pilot having a time index of 4 and a frequency index of 0. According to the evaluation results provided by the evaluation unit 44A, the time-domain interpolation unit 44B further identifies the respective $H_{(t=2, f=3N)}$ corresponding to respective sets of data having a time index of 2 and a frequency index of 3N (N=0, 1, 2, . . . ). For example, the time-domain interpolation unit 44B may determine the frequency-domain channel effect $H_{(t=2, f=0)}$ located between $H_{(t=0, f=0)}$ and $H_{(t=4, f=0)}$ by time-domain interpolation. Likewise, the time-domain interpolation unit 44B may determine the frequency-domain channel effect $H_{(t=2, f=3)}$ by interpolating $H_{(t=1, f=3)}$ and $H_{(t=5, f=3)}$. The frequency-domain channel effect $H_{(t=2, f=6)}$ of the scatter pilot having a time index of 2 and a frequency index of 6, without undergoing the time-domain interpolation, is directly included in the result generated by the evaluation unit 44A. The output signal of the time-domain interpolation unit 44B is a set of frequency-domain channel effect samples corresponding to a time index of 2 (at a sampling interval of 3). It should be noted that, details of the above approach for determining the frequency-domain channel effects of the frequency-domain scatter pilots are known to a person having ordinary skill in the art, and shall be omitted herein.

Figure 1A:
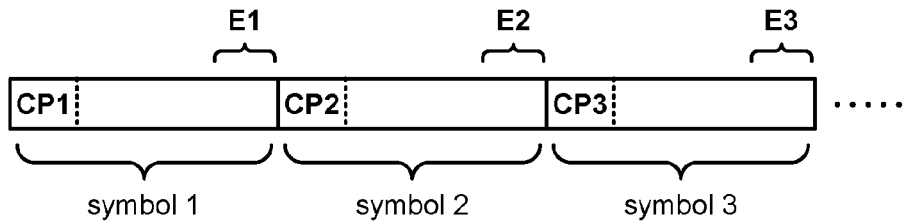
FIG. 1(A) shows an exemplary signal compliant to the DVB-T and ISDB-T specifications.
Figure 1B:
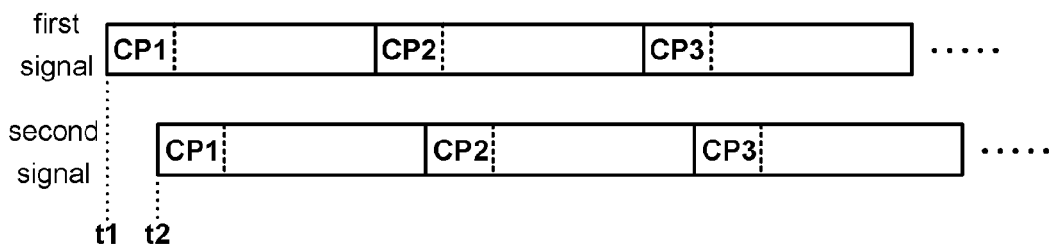
FIG. 1(B) shows a possible result of the signal transmitted via a multipath environment and then arriving at a receiver.
Figure 1C:
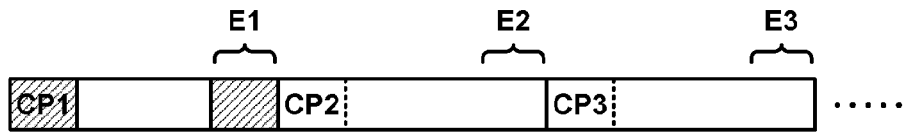
FIGS. 1(C) and 1(D) illustrate possible positions of a sampling window.
Figure 1D:
Figure 1E:
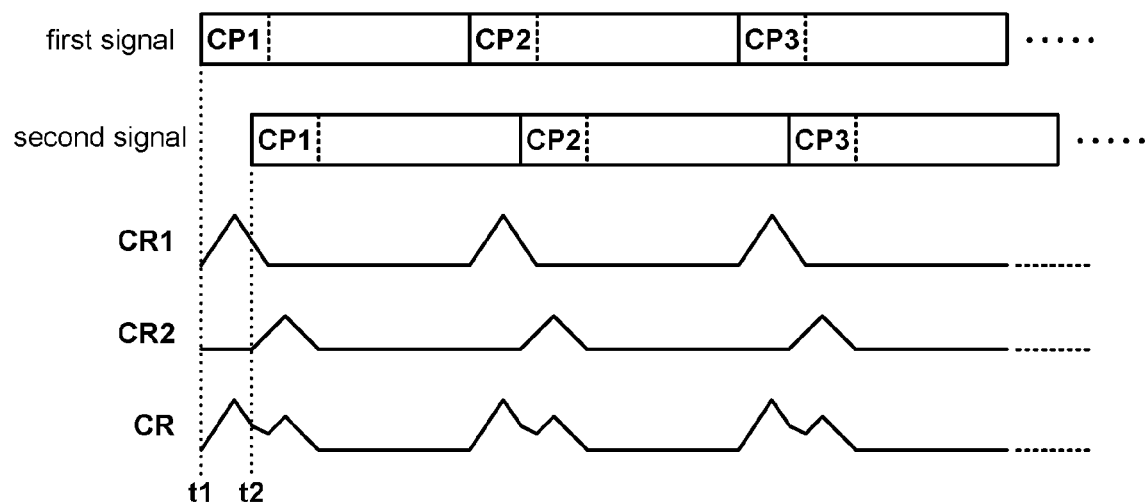
FIG. 1(E) shows results of correlation calculations on the signals.
Figure 2:
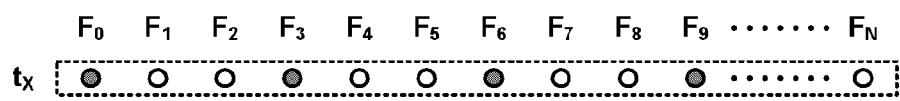
FIG. 2 is a schematic diagram of a signal including multiple frequency components.
Figure 3A:
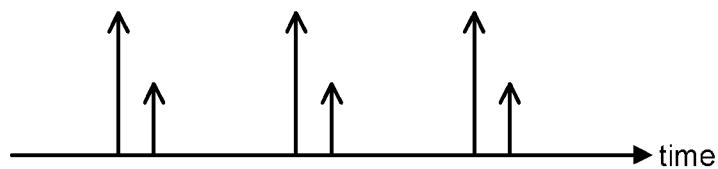
FIGS. 3(A) to 3(C) show exemplary results after performing IFFT on frequency-domain channel effects.
Figure 3B:
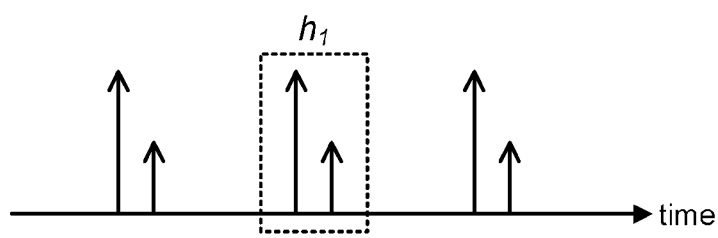
Figure 3C:
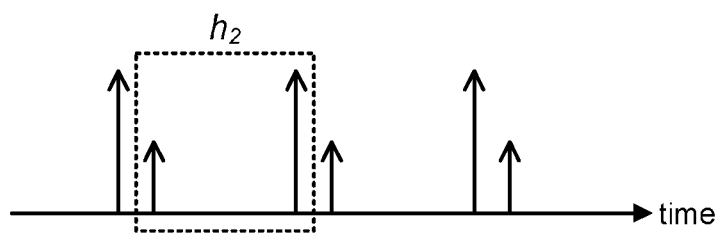
Figure 7A:
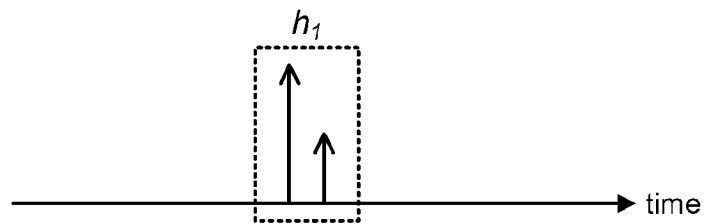
FIGS. 7(A) and 7(B) are exemplary output signals from a filtering unit according to an embodiment of the present invention.
Figure 7B:
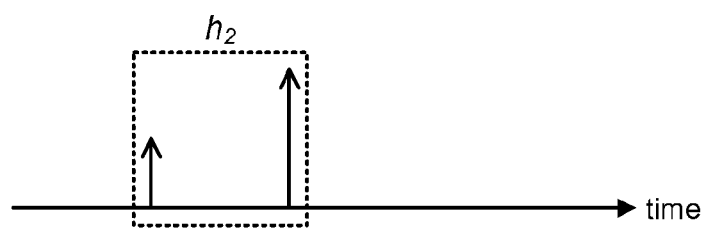

After having determined the respective frequency-domain channel effects corresponding to the subcarriers having a time index of 2 and a frequency index of 3N, the IFFT unit 44C performs IFFT on the frequency-domain channel effects to generate a set of IFFT transformation results. The filtering unit 44D filters the transformation results provided by the IFFT unit 44C to identify two possible time-domain channel effects $h_1$ and $h_2$. Taking FIGS. 3(A) and 3(B) for example, the two output signals from the filtering unit 44D may be as shown in FIGS. 7(A) and 7(B), i.e., components other than the time-domain channel effects $h_1$ and $h_2$ in FIG. 3(A) are filtered out. The FFT unit 44E performs FFT to transform the time-domain channel effects $h_1$ and $h_2$ into corresponding frequency-domain channel effects $H_1$ and $H_2$, respectively. Thus, in addition to the respective frequency-domain channel effects corresponding to the subcarriers having a frequency index of 3N and provided by the time-domain interpolation unit 44B, the FFT unit 44E, by frequency-domain interpolation, in equivalence estimates the respective frequency-domain channel effects corresponding to the subcarriers having a time index of 2 and a frequency index of non-3N, including the channel effects corresponding to the subcarriers having a time index of 2 and a frequency index of P. In the description below, $H_{1(t=2, f=P)}$, from the frequency-domain channel effect $H_1$, represents the channel effect corresponding to the frequency index P, and $H_{2(t=2, f=P)}$, from the frequency-domain channel effect $H_2$, represents the channel effect corresponding to the frequency index P.

As previously described, the original contents of the TPS at the subcarriers having a time index of 2 and a frequency index of P before passing through and unaffected by the multipath environment are known. In the description below, X represents original contents of the TPS, and Y represents the TPS affected by the multipath environment (i.e., the TPS having a time index of 2 and received by the reception module 42). The equalization module 46 performs an equalization process on Y according to the channel effects $H_{1(t=2, f=P)}$ and $H_{2(t=2, f=P)}$. Assuming that $H_1$ but not $H_2$ truly represents the frequency-domain channel effect of the multipath environment, Y is substantially equal to $H_{1(t=2, f=P)}X$. Therefore, the calculation and result of the equalization module 46 may be represented as:

$$\frac{H_{1(t=2,f=P)} * Y}{|H_{1(t=2,f=P)}|^2} = \frac{H_{1(t=2,f=P)} * H_{1(t=2,f=P)}X}{|H_{1(t=2,f=P)}|^2} = X \quad \text{equation (1)}$$

$$\frac{H_{2(t=2,f=P)} * Y}{|H_{2(t=2,f=P)}|^2} = \frac{H_{2(t=2,f=P)} * H_{1(t=2,f=P)}X}{|H_{2(t=2,f=P)}|^2} \neq X \quad \text{equation (2)}$$

In practice, by further considering possible noises in Y, the equalization result corresponding to the channel effect $H_{1(t=2, f=P)}$ is expectedly more similar to X than the equalization result corresponding to the channel effect $H_{2(t=2, f=P)}$. Comparing X with the two equalization results, the selection module 48 may then select $H_1$ to truly represent the frequency-domain channel effect of the multipath environment.

The TPS in the ISDB-T system is generated through differential binary phase shift keying (DBPSK), and is a real-number signal. As such, the selection module 48 may select the frequency-domain channel effect according to the imaginary parts of the two equalization results. More specifically, the selection module 48 may select the equalization result having a smaller imaginary part from the two equalization results, and determine the channel effect corresponding to the equalization result as the frequency-domain channel effect of the multipath environment.

Figure 8A:
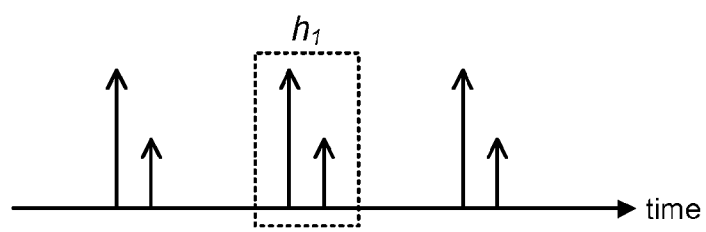
FIGS. 8(A) and 8(B) illustrate exemplary widths of a filtering window adopted by a filtering unit according to an embodiment of the present invention.
Figure 8B:
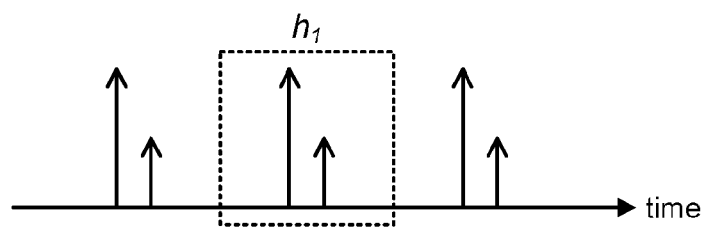

In one embodiment, the equalization process conducted by the equalization module 46 may also be utilized as a filtering criteria adopted by the filtering unit 44D to acquire an even more precise channel effect. As shown in FIGS. 8(A) and 8(B), the width of the filtering window utilized by the filtering unit 44D is not limited to only one possibility. In FIG. 8(A), as a more strict filtering criteria is adopted, although affects resulted by neighboring noises are removed, it is possible that low-energy components in the channel effect outside such range be also filtered out at the same time. The FFT unit 44E may generate respective candidate channel effects according to the two different filtering results. Correspondingly, the equalization module 46 may respectively test the two candidate channel effects and select from the equalization results the one that is more similar to the known signal.

Figure 9:
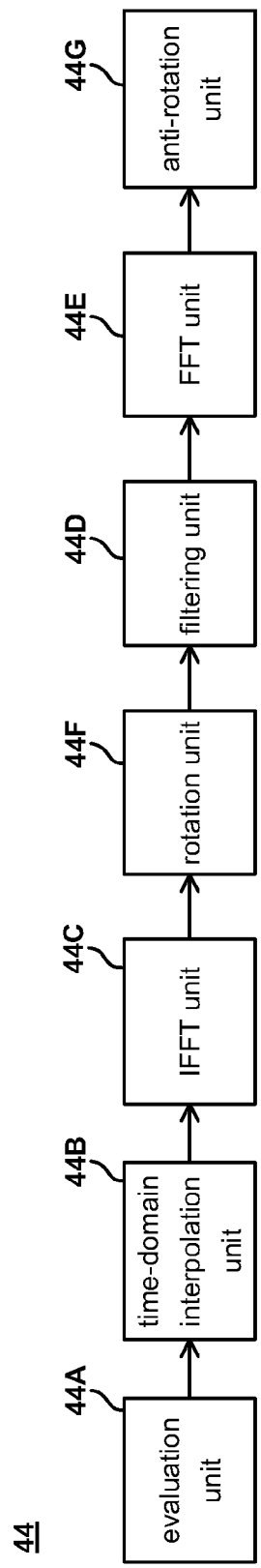
FIG. 9 shows a detailed example of a preliminary estimation module according to another embodiment of the present invention.
Figure 10A:
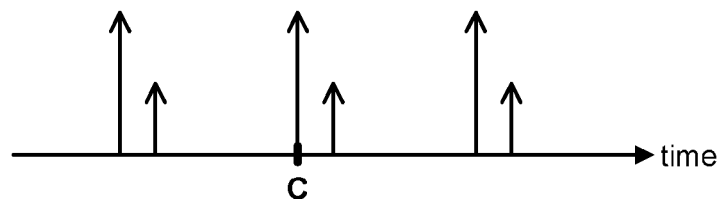
FIGS. 10(A) to 10(D) illustrate functions of a rotation unit and an anti-rotation unit according to an embodiment of the present invention.
Figure 10B:
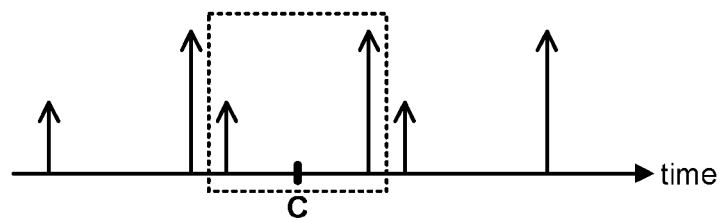
Figure 10C:
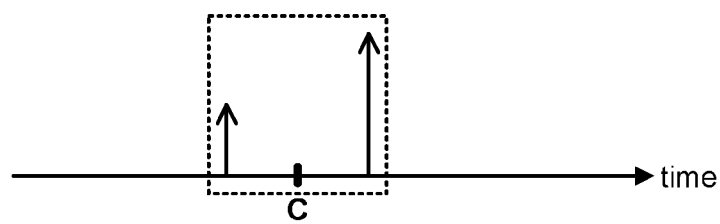
Figure 10D:
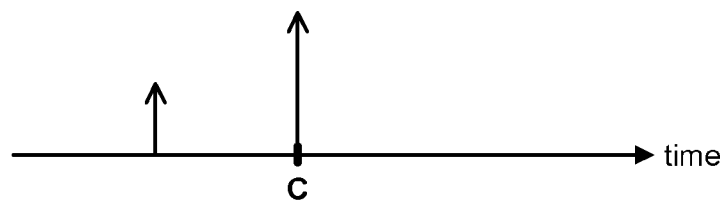

FIG. 9 shows another detailed example of the preliminary estimation module 44. In addition to the abovementioned evaluation unit 44A, the time-domain interpolation unit 44B, the IFFT unit 44C, the filtering unit 44D and the FFT unit 44E, the preliminary estimation module 44 in this example further includes a rotation unit 44F and an anti-rotation unit 44G. As shown in FIG. 10(A), in the output result of the IFFT unit 44C, the pulse having the maximum strength is usually placed at a center position C of the time axis. The rotation unit 44F relocates positions of the pulses relative to the time axis. To obtain the channel effect $H_2$, as shown in FIG. 10(B), the rotation unit 44F may rotate the pulses in a way that the filtering range of the filtering unit 44D is located at about the center position C of the time axis, so as to provide a filtering result as shown in FIG. 10(C). By setting the time-domain filtering range as symmetrical with respect to the center of the time axis, the channel effect $H_2$ subsequently provided to the equalization module 46 may be rendered as a real number so that a calculation circuit in the equalization module 46 may be maintained simple. The anti-rotation unit 44G in equivalence relocates (reverse-rotates) the time-domain pulses corresponding to the output signal from the FFT unit 44E to original positions. Relocating the pulses in the time domain is in equivalence respectively providing the frequency components with a phase rotation amount in the frequency domain, and so the rotation unit 44F and the anti-rotation unit 44G may be respectively implemented by a complex multiplier for providing a phase rotation amount required for a corresponding movement amount in the time domain.

It should be noted that, the frequency-domain channel effects, in the channel effect $H_1$, of the subcarriers having a frequency index of 3, are theoretically identical to the frequency-domain channel effects, in the channel effect $H_2$, of the subcarriers having the same frequency index, as these frequency-domain channel effects are all from the same output from the time-domain interpolation unit 44B. Therefore, the reference signal (e.g., the TPS) for testing the channel effects $H_1$ and $H_2$ in the equalization module 46 cannot be the signal carried on the subcarriers having a frequency index of 3N. Alternatively speaking, the known signal carried on the subcarriers having a frequency index of non-3N may be utilized for the test calculations in the equalization module 46.

Compared to the prior art that is capable of identifying the correct channel effect only after carrying out extensive tests, the evaluation procedure performed in the wireless communication system 400 is much simpler such that the related operation time can be significantly reduced. It should be noted that, the concept of the present invention is not limited to applications of DVB-T or ISDB-T reception systems, and is implementable to situations where a correct channel effect needs to be selected from multiple candidate channel effects for a multipath environment. Further, details for generating the candidate channel effects are not limited to the described operation details of the preliminary estimation module 44.

After identifying the correct channel effect, the wireless reception system 400 may further perform other procedures accordingly, e.g., adjusting circuit settings of the reception module 42 or determining boundaries between the symbols of the input signal.

Figure 11:
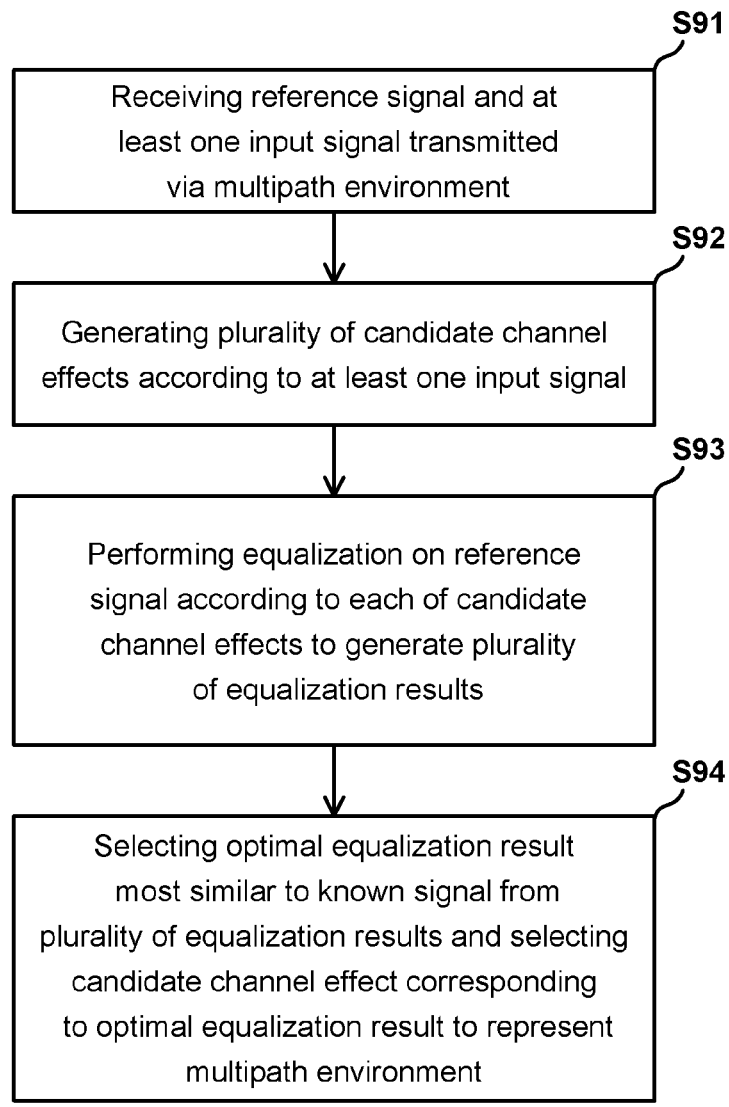
FIG. 11 shows a flowchart of a method for estimating a channel effect according to an embodiment of the present invention.

FIG. 11 shows a flowchart of a method for estimating a channel effect according to another embodiment of the present invention. In step S91, a reference signal and at least one input signal transmitted via a multipath environment are received. The reference signal is associated with a known signal unaffected by the multipath environment. In step S92, a plurality of candidate channel effects are generated according to the at least one input signal. In step S93, an equalization process is performed on the reference signal according to each of the candidate channel effects to generate a plurality of equalization results. In step S94, an optimal equalization result is selected from the equalization results, and the candidate channel effect corresponding to the optimal equalization result is selected to represent the multipath environment.

Circuitry operation details and variations (e.g., the method for generating a plurality of candidate channel effects) given in the description associated with the wireless reception system 400 are applicable to the method for estimating a channel effect in FIG. 11, and shall be omitted herein.

A wireless reception system and a method for estimating a channel effect of the present invention are as disclosed. In the wireless reception system and the method for estimating a channel effect of the present invention, an equalization process corresponding to different channel effects is performed on a reference signal, and a channel effect is determined to best represent a multipath environment that the reference signal passed through according to the equalization results. Compared to the prior art that is capable of identifying the correct channel effect only after carrying out extensive tests, the evaluation procedure performed in the wireless communication system is much simpler such that the related operation time can be significantly reduced. It should be noted that, the concept of the present invention is not limited to applications of DVB-T or ISDB-T reception systems, and is implementable to situations where a correct channel effect needs to be selected from multiple candidate channel effects for a multipath environment.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless reception system, comprising: a reception module for receiving a reference signal and at least one input signal transmitted via a multipath environment, wherein the reference signal is associated with a known signal unaffected by the multipath environment; a preliminary estimation module for generating a plurality of candidate channel effects according to the at least one input signal; an equalization module for performing an equalization process on the reference signal according to each of the candidate channel effects to generate a plurality of equalization results; and a selection module for selecting an optimal equalization result most similar to the known signal from the equalization results, and to select the candidate channel effect corresponding to the optimal equalization result to represent the multipath environment, wherein the reference signal is a transmission parameter signaling (TPS) having undergone differential binary phase shift keying (DBPSK), and the selection module selects the equalization result having a smallest imaginary part from the equalization results as the optimal equalization result most similar to the known signal.

2. The wireless reception system according to claim 1, wherein the at least one input signal comprises a plurality of known components, and the preliminary estimation module comprises: an evaluation unit for generating respective frequency-domain channel effects of the known components; a time-domain interpolation unit for performing time-domain interpolation on the frequency-domain channel effects to generate a set of frequency-domain channel effect samples; an inverse fast Fourier transform (IFFT) unit for performing IFFT on the set of frequency-domain channel effect samples to generate a set of IFFT transformation results; a filtering unit for selecting a plurality of candidate time-domain channel effects from the set of IFFT transformation results; and a fast Fourier transform (FFT) unit for performing FFT on the candidate time-domain channel effects to generate the candidate channel effects.

3. The wireless reception system according to claim 2, wherein two candidate time-domain channel effects among the candidate time-domain channel effects correspond to a same primary filtering range but two different filtering range widths.

4. The wireless reception system according to claim 2, wherein the preliminary estimation module further comprises:
- a rotation unit, coupled between the IFFT unit and the filtering unit, for providing a phase rotation amount to the set of IFFT transformation results; and
- an anti-rotation unit, coupled between the FFT unit and the equalization unit, for reverse-rotating the candidate channel effects for a phase anti-rotation amount.

5. A method for estimating a channel effect, comprising: a) step for receiving a reference signal and at least one input signal transmitted via a multipath environment, wherein the reference signal is associated with a known signal unaffected by the multipath environment; b) step for generating a plurality of candidate channel effects according to the at least one input signal; c) step for performing an equalization process on the reference signal according to each of the candidate channel effects to generate a plurality of equalization results; and d) step for selecting an optimal equalization result most similar to the known signal from the equalization results, and selecting the candidate channel effect corresponding to the optimal equalization result to represent the multipath environment, wherein the reference signal is a transmission parameter signaling (TPS) having undergone differential binary phase shift keying (DBPSK), and step (d) comprises selecting the equalization result having a smallest imaginary part from the equalization results as the optimal equalization result most similar to the known signal.

6. The method according to claim 5, wherein the at least one input signal comprises a plurality of known components, and step (b) comprises: b1) step for generating respective frequency-domain channel effects of the known components; b2) step for performing time-domain interpolation on the frequency-domain channel effects to generate a set of frequency-domain channel effect samples; b3) step for performing inverse fast Fourier transform (IFFT) on the set of frequency-domain channel effect samples to generate a set of IFFT transformation results; b4) step for selecting a plurality of candidate time-domain channel effects from the set of IFFT transformation results; and b5) step for performing fast Fourier transform (FFT) on the candidate time-domain channel effects to generate the candidate channel effects.

7. The method according to claim 6, wherein two candidate time-domain channel effects among the candidate time-domain channel effects correspond to a same primary filtering range but two different filtering range widths.

8. The method according to claim 6, between step (b3) and step (b4), further comprising step for providing a phase rotation amount to the set of IFFT transformation results; between step (b5) and step (c), further comprising step for reverse-rotating the candidate channel effects for a phase anti-rotation amount.

* * * * *